(12) United States Patent
Liao

(10) Patent No.: US 11,252,120 B2
(45) Date of Patent: Feb. 15, 2022

(54) INFERRING A GEOGRAPHIC LOCATION FOR AN ENTITY AT A GEOGRAPHIC GRANULARITY BASED ON GEOGRAPHIC LOCATIONS OF USERS OF AN ONLINE SYSTEM INTERACTING WITH THE ENTITY

(71) Applicant: Facebook, Inc., Menlo Park, CA (US)

(72) Inventor: Alex Yu Liao, New York, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/669,405

(22) Filed: Oct. 30, 2019

(65) Prior Publication Data

US 2021/0136020 A1    May 6, 2021

(51) Int. Cl.
*H04L 12/58* (2006.01)
*G06F 16/9535* (2019.01)
*G06F 16/29* (2019.01)
*G06F 16/9537* (2019.01)

(52) U.S. Cl.
CPC ............. *H04L 51/20* (2013.01); *G06F 16/29* (2019.01); *G06F 16/9535* (2019.01); *G06F 16/9537* (2019.01); *H04L 51/32* (2013.01)

(58) Field of Classification Search
CPC ..... H04L 51/20; H04L 51/32; G06F 16/9535; G06F 16/9537; G06F 16/29
USPC ....................................................... 709/206
See application file for complete search history.

(56) References Cited

U.S. PATENT DOCUMENTS

| | | | | |
|---|---|---|---|---|
| 2009/0005968 A1* | 1/2009 | Vengroff | ............. | G06F 16/9537 701/425 |
| 2013/0304818 A1* | 11/2013 | Brumleve | ............. | G06Q 30/02 709/204 |
| 2014/0040371 A1* | 2/2014 | Gurevich | ............. | G06F 16/9537 709/204 |
| 2015/0350351 A1* | 12/2015 | Tung | ....................... | H04W 4/21 709/204 |
| 2016/0147789 A1* | 5/2016 | Sharifi | ............. | G06F 16/24578 707/724 |
| 2016/0247175 A1* | 8/2016 | Milton | ............... | G06Q 30/0205 |
| 2017/0124207 A1* | 5/2017 | Green | ................. | G06F 16/9537 |
| 2017/0156033 A1* | 6/2017 | Kalis | ..................... | H04W 4/029 |
| 2017/0353880 A1* | 12/2017 | Gerlach | ............... | H04W 4/021 |
| 2018/0239823 A1* | 8/2018 | Singh | .................... | G06F 16/951 |

* cited by examiner

*Primary Examiner* — Umar Cheema
*Assistant Examiner* — Tony Williams
(74) *Attorney, Agent, or Firm* — Fenwick & West LLP

(57) ABSTRACT

An online system receives information describing one or more interactions by each of a set of online system users with an entity having a presence in the online system, in which the information includes a geographic location of each user stored in a corresponding user profile. The online system determines multiple polygons defined at different geographic granularities, in which each polygon includes a region on a geographic map. A score is computed for each polygon based on a number of the set of users who interacted with the entity and who have a geographic location within the polygon, as well as a total number of users having a geographic location within the polygon. A polygon is selected based on the scores and a geographic location for the entity is inferred for the entity as the selected polygon at the geographic granularity of the selected polygon.

20 Claims, 5 Drawing Sheets

Receive Information Describing Interaction(s) by Each User with Entity, in Which Information Includes Geographic Location of Each User
305

Determine Polygons Each Comprising Region on Geographic Map, in Which Polygons Are Defined at Different Geographic Granularities
310

For Each Polygon, Compute Score Based on Number of Users That Have Interacted with Entity Having Geographic Location Within Polygon and Total Number of Users Having Geographic Location Within Polygon
315

Select Polygon Based on Scores
320

Infer Geographic Location for Entity as Selected Polygon at Geographic Granularity of Selected Polygon
325

Send Content Posted by Entity for Presentation to Viewing User(s) if Geographic Location of Each Viewing User is Within Inferred Geographic Location for Entity
330

FIG. 3

| Name 505 | Geographic Granularity 510 | # of Users Interacting with Entity 515 | Total # of Users 520 | Score (Ratio of # of Users Interacting with Entity to Total # of Users) 525A |
|---|---|---|---|---|
| San Francisco | County | 24,131 | 96,116 | 0.25106122 |
| San Francisco | City | 24,130 | 96,176 | 0.25089419 |
| California | State | 99,767 | 750,567 | 0.13292218 |
| Alameda | County | 11,549 | 158,131 | 0.07303438 |
| United States | Country | 149,599 | 2,412,887 | 0.06200000 |
| 94103 | Zip Code | 3,685 | 70,057 | 0.05260003 |
| Oakland | City | 4,881 | 122,638 | 0.03980006 |
| 94102 | Zip Code | 2,349 | 67,929 | 0.03458022 |
| South of Market, San Francisco | City | 2,586 | 120,111 | 0.02153008 |
| ... | ... | ... | ... | ... |

FIG. 5A

| Name 505 | Geographic Granularity 510 | # of Users Interacting with Entity 515 | Commonality 530 | Over-Performance 535 | Score (Commonality * Over-Performance) 525B | Ratio to Top 540 | ... |
|---|---|---|---|---|---|---|---|
| San Francisco | County | 24,131 | 0.120826087931714 | 1.485841291959669e-7 | 1.79528390594608e-8 | 1 | ... |
| San Francisco | City | 24,130 | 0.120818355345277 | 1.485927104022914e-7 | 1.79527268871799e-8 | 1 | ... |
| California | State | 99,767 | 0.499398102657199 | 2.013333375760508e-8 | 1.00545486787128e-8 | 0.5601 | ... |
| Alameda | County | 11,549 | 0.057827195249708 | 5.623692741623108e-8 | 3.25202378194208e-9 | 0.1811 | ... |
| United States | Country | 149,599 | 0.748872489075336 | 3.515331530357608e-9 | 2.63253507306408e-9 | 0.1466 | ... |
| 94103 | Zip Code | 3,685 | 0.018452142986732 | 1.153136415926608e-7 | 2.12778380298858e-9 | 0.1185 | ... |
| Oakland | City | 4,881 | 0.024423752659723 | 7.150543135193408e-8 | 1.74643096916658e-9 | 0.0973 | ... |
| 94102 | Zip Code | 2,349 | 0.011757313245001 | 1.441253447050208e-7 | 1.69452682424078e-9 | 0.0944 | ... |
| South of Market, San Francisco | City | 2,586 | 0.012947117073274 | 1.197476606851108e-7 | 1.55038698214088e-9 | 0.0864 | ... |
| ... | ... | ... | ... | ... | ... | ... | ... |

FIG. 5B

INFERRING A GEOGRAPHIC LOCATION FOR AN ENTITY AT A GEOGRAPHIC GRANULARITY BASED ON GEOGRAPHIC LOCATIONS OF USERS OF AN ONLINE SYSTEM INTERACTING WITH THE ENTITY

TECHNICAL FIELD

This disclosure relates generally to online systems, and more specifically to inferring a geographic location for an entity at a geographic granularity based on geographic locations of users of an online system interacting with the entity.

BACKGROUND

Conventionally, online systems allow entities (e.g., content publishers, businesses, organizations, etc.) to create pages to establish their presence in the online systems and to connect and exchange content with other entities or users of the online systems. Entities may post various types of information to these pages, such as information about themselves, about their products or services, etc. Furthermore, entities may have various geographic locations, in which the geographic locations may be specified by the entities themselves. For example, an entity having a presence in an online system may have a geographic location specified by the entity, in which the geographic location may correspond to a city in which the entity's headquarters is located, or a county, a state, or a country in which the entity conducts business.

To present content to online system users that is likely to be relevant to the users, online systems may select content for presentation to the users based on geographic locations of the users and geographic locations of entities that posted the content to the online systems. For example, suppose that an online system receives a request to present content to a user of the online system. In this example, the online system may retrieve a geographic location of the user (e.g., a hometown of the user stored in a user profile of the user) and select a content item for presentation to the user if the content item was posted to the online system by an entity having the same geographic location.

Although online systems may allow entities having a presence in the online systems to specify their geographic locations, the online systems may select content for presentation to online system users who do not find the content relevant if information describing the geographic locations of entities that posted the content to the online systems is incomplete or imprecise. For example, an entity may fail to specify their geographic location to an online system in which the entity has established a presence. Furthermore, online systems may not allow entities to specify their geographic locations at sufficient geographic granularities. For example, suppose that an entity having a presence in an online system corresponds to a convenience store that is located in the Upper West Side of Manhattan and that the lowest geographic granularity at which the online system allows entities to specify their geographic locations corresponds to the level of a borough. In this example, if the entity specifies its geographic location to be the borough of Manhattan, content posted to the online system by the entity may be selected for presentation to online system users who are unlikely to find the content relevant, such as users of the online system who live in the Financial District of Manhattan. Hence, online systems may fail to present relevant content posted by entities to online system users, which may degrade user experience.

SUMMARY

Online systems conventionally allow entities to create pages to establish their presence in the online systems and to connect and exchange content with other entities or users of the online systems. Entities may post various types of information to these pages and may specify their geographic locations. To present content to online system users that is likely to be relevant to the users, online systems may select content for presentation to the users based on geographic locations of the users and geographic locations of entities that posted the content to the online systems. However, online systems may select content for presentation to online system users who do not find the content relevant if information describing the geographic locations of entities that posted the content to the online systems is incomplete or imprecise, which may degrade user experience.

To resolve this issue, an online system infers a geographic location for an entity at a geographic granularity based on geographic locations of users of the online system interacting with the entity. More specifically, the online system receives information describing one or more interactions by each of a set of users of the online system with an entity having a presence in the online system, in which the information includes a geographic location of each of the set of users stored in a corresponding user profile. The online system then determines multiple polygons defined at different geographic granularities, in which each polygon includes a region on a geographic map. For each of the polygons, a score is computed based at least in part on a number of the set of users who have interacted with the entity and who have a geographic location that is within the polygon, as well as a total number of users of the online system having a geographic location that is within the polygon. A polygon is then selected from the polygons based at least in part on the scores and a geographic location for the entity is inferred for the entity as the selected polygon at the geographic granularity of the selected polygon.

BRIEF DESCRIPTION OF THE DRAWINGS

FIG. 3 is a flow chart of a method for inferring a geographic location for an entity at a geographic granularity based on geographic locations of users of an online system interacting with the entity, in accordance with an embodiment.

FIGS. 5A and 5B are tables of values used to infer a geographic location for an entity at a geographic granularity, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
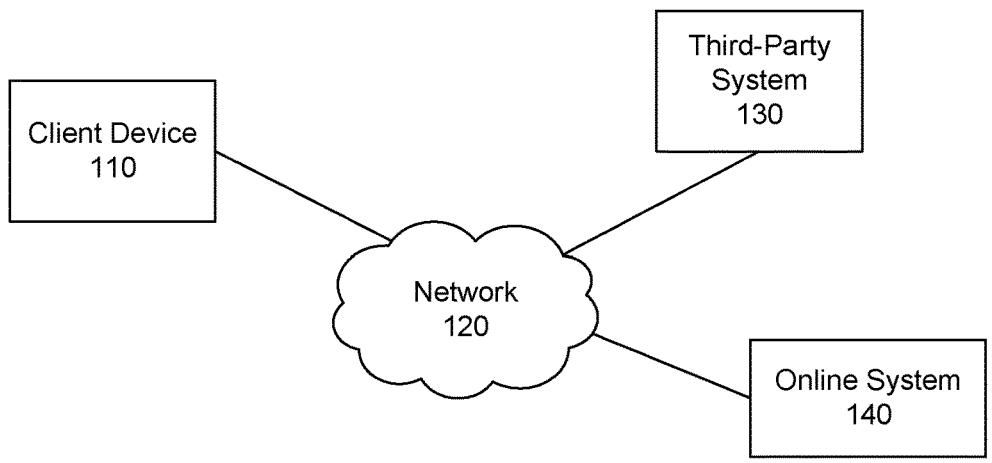
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 provides content or other information for presentation via a client device 110. A third-party system 130 also may communicate information to the online system 140, such as advertisements, content, or information about an application provided by the third-party system 130.

Figure 2:
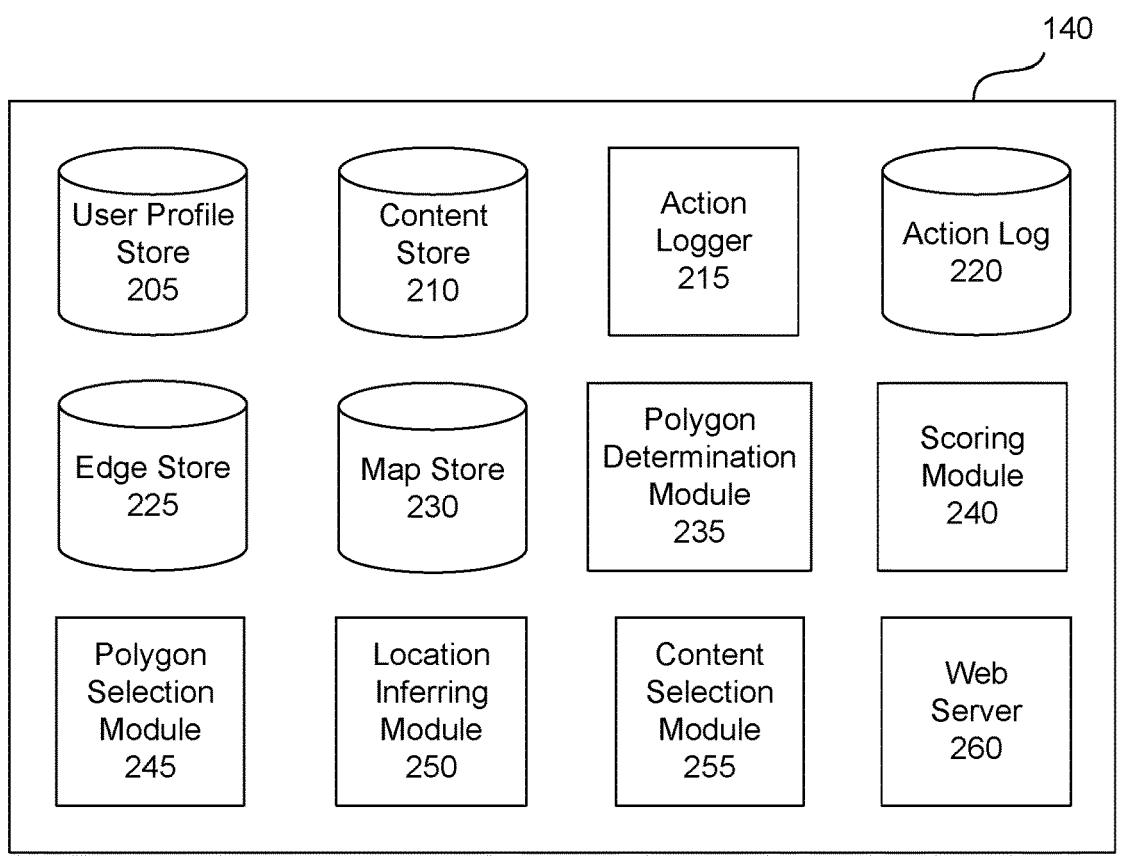
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a map store 230, a polygon determination module 235, a scoring module 240, a polygon selection module 245, a location inferring module 250, a content selection module 255, and a web server 260. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image, with information identifying the images in which a user is tagged stored in the user profile of the user. A user profile in the user profile store 205 also may maintain references to actions by the corresponding user performed on content items in the content store 210 and stored in the action log 220.

A user of the online system 140 may have one or more geographic locations, which may be stored in association with a user profile of the user in the user profile store 205. Geographic locations of users may correspond to various geographic granularities, such as a campus, a park, a neighborhood, a village, a town, a borough, a city, a zip code, a county, a forest, a desert, a region, a state, an island, a country, a continent, or any other suitable geographic location. A geographic location of a user may be based on various types of information, such as a home associated with the user (e.g., a town corresponding to the user's hometown), a business associated with the user (e.g., a city in which the user's office is located), a current geographic location of the user (e.g., a neighborhood corresponding to GPS coordinates at which a client device 110 associated with the user is currently located), or any other suitable geographic location that may be associated with the user. In some embodiments, a geographic location of a user may be a geographic location with which the user is frequently associated. For example, if a frequency with which a client device 110 associated with a user is located in a particular zip code is at least a threshold frequency, the user may have a geographic location corresponding to the zip code.

While user profiles in the user profile store 205 frequently are associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

As used herein, an "entity" may be a user of the online system that can post content, in which case an interaction with the entity may include interactions with content posted by the entity or communications with the entity. In other embodiments, the "entity" may be to an individual content item or a collection of posted content, and the interaction with the entity is an interaction with that content, such as viewing, liking, commenting one, or sharing the content. Alternatively, the "entity" may include online information about content with which a user may interact, such as hashtags or other metadata.

The content store 210 stores objects that each represent various types of content. Examples of content represented by an object include a page post, a status update, an image (e.g., a photograph), a video, a link, a shared content item, a gaming application achievement, a check-in event at a local business, a page (e.g., a brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action logger 215 may receive information describing various types of interactions by users of the online system 140 with an entity having a presence in the online system 140. In some embodiments, these interactions may be associated with an event associated with the entity, a domain associated with the entity, a physical location associated with the entity, an object maintained in the online system 140 associated with the entity (e.g., a page, a content item, a group, or an application), etc. Examples of types of interactions with an entity by users of the online system 140 include sending a message to the entity, joining a group associated with the entity, attending an event associated with the entity, checking-in to a physical location associated with the entity, installing an application associated with the entity, and engaging in a transaction with the entity. Additional examples of types of interactions with an entity by users of the online system 140 include expressing a preference for or accessing a page associated with the entity, as well as accessing, expressing a preference for, commenting on, or sharing a content item posted by the entity, clicking on a URL associated with a domain, in which the domain is associated with the entity, or any other suitable types of interactions.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The map store 230 stores one or more geographic maps, in which each geographic map may include multiple regions. For example, the map store 230 may store a map of the world including multiple regions corresponding to different continents. Regions on a geographic map may correspond to different geographic granularities. For example, suppose that the map store 230 stores maps of different continents, in which the map of each continent includes multiple regions corresponding to different countries. In this example, the region of each map corresponding to a country also may include multiple regions corresponding to different states, counties, cities, zip codes, etc. The map store 230 is further described below in conjunction with FIGS. 3 and 4.

The polygon determination module 235 determines (e.g., as shown in step 310 of FIG. 3) multiple polygons that each includes a region on a geographic map, in which the polygons are defined at different geographic granularities. Examples of different geographic granularities may include a campus, a park, a neighborhood, a village, a town, a borough, a city, a zip code, a county, a forest, a desert, a region, a state, an island, a country, a continent, etc. For example, if a geographic map corresponds to a map of the contiguous United States, the polygon determination module 235 may determine a polygon that includes a region corresponding to the 48 contiguous states and the District of Columbia. In this example, the polygon determination module 235 also may determine polygons that each includes a region corresponding to one of the 48 states. Continuing with this example, the polygon determination module 235 also may determine polygons that each includes a smaller region within each of the 48 states (e.g., counties, cities, zip codes, etc.). The functionality of the polygon determination module 235 is further described below in conjunction with FIGS. 3 and 4.

The scoring module 240 computes (e.g., as shown in step 315 of FIG. 3) a score for each polygon determined by the polygon determination module 235. The scoring module 240 computes the score for a polygon based at least in part on a number of users of the online system 140 who have interacted with an entity having a presence in the online system 140, in which the users have a geographic location that is within the polygon, as well as a total number of users of the online system 140 who have a geographic location that is within the polygon. For example, suppose that 100 online system users have interacted with an entity having a presence in the online system 140, in which the 100 users have a current geographic location that is within a polygon and that 10,000 users of the online system 140 have a current geographic location that is within the polygon. In this example, the scoring module 240 may compute a score for the polygon to be a ratio of the first number of users to the second number of users (i.e., 100/10,000 or 0.01).

The scoring module 240 also may compute the score for a polygon based on one or more weights associated with users who interacted with an entity having a presence in the online system 140, in which the users have a geographic location that is within the polygon. In some embodiments, the weights may be associated with each user based on a type of interaction with the entity by the user. For example, the scoring module 240 may associate a weight with each user who interacted with an entity having a presence in the online system 140 based on a type of interaction with the entity, such that a user who attended an event associated with the entity is associated with a first weight and a user who clicked on a content item posted by the entity is associated with a second weight. In this example, to compute a score for a polygon, the scoring module 240 may compute a product of the first weight and a number of users who attended the event and who have a geographic location within the polygon, as well as a product of the second weight and a number of users who clicked on the content item and who have a geographic location within the polygon. Continuing with this example, the scoring module 240 may compute the score for the polygon as a ratio of the sum of the products to a total number of users of the online system 140 who have a geographic location that is within the polygon. In various embodiments, the weights may be based on an amount of time that has elapsed since each user interacted with the entity. In the above example, the weight associated with each user alternatively may be inversely proportional to an amount of time that has elapsed since the user interacted with the entity.

In some embodiments, the scoring module 240 also may compute the score for a polygon based on one or more values computed by the scoring module 240. In various embodiments, the scoring module 240 may compute a measure of commonality for each polygon that describes a percentage of interactions with an entity by users of the online system 140 having a geographic location that is within the polygon. For example, for a polygon corresponding to a city, if none of the users of the online system 140 having a geographic location that is within the city performed an interaction with an entity, the scoring module 240 may compute a measure of commonality of 0% for the polygon. Alternatively, in the above example, for a polygon corresponding to a country, if all of the users of the online system 140 who performed an interaction with the entity have a geographic location that is within the country, the scoring module 240 may compute a measure of commonality of 100% for the polygon. Furthermore, in some embodiments, the scoring module 240 also may compute a measure of over-performance for each polygon that describes a number of interactions with an entity by users of the online system 140 having a geographic location that is within the polygon that exceeds the number of interactions with the entity expected for users of the online system 140, given the population of the polygon. In embodiments in which the scoring module 240 computes a value that indicates a measure of commonality and/or a value that indicates a measure of over-performance for a polygon, the scoring module 240 may compute a score for the polygon based at least in part on one or more of these values. For example, the scoring module 240 may compute a score for a polygon to be a product of the measure of commonality and the measure of over-performance for the polygon.

In various embodiments, in addition to computing a score for a polygon determined by the polygon determination module 235, the scoring module 240 also may compute one or more additional values that may be used by the polygon selection module 245 (described below) to select a polygon. In some embodiments, the scoring module 240 may compute a ratio of a score to a top score computed by the scoring module 240. In such embodiments, if a score computed for a polygon is the highest score computed for all polygons determined by the polygon determination module 235, the ratio of the score to the top score is one. Furthermore, in such embodiments, if the score computed for a polygon is not the highest score computed for all polygons determined by the polygon determination module 235, the ratio of the score to the top score is less than one. In various embodiments, the scoring module 240 also may compute values for each polygon corresponding to statistical measures that indicate whether the number of users who have a geographic location that is within the polygon and who interacted with an entity having a presence in the online system 140 is statistically significant (e.g., an n-Sigma, a Kullback-Leibler (KL) Divergence, etc.). For example, the polygon selection module 245 may compute an n-Sigma value for a polygon, in which the value of n is the number of standard deviations that an observation (i.e., a number of users of the online system 140 who have a geographic location that is within the polygon and who interacted with an entity having a presence in the online system 140) deviates from the mean for a distribution of online system users. The functionality of the scoring module 240 is further described below in conjunction with FIGS. 3, 5A, and 5B.

The polygon selection module 245 selects (e.g., as shown in step 320 of FIG. 3) a polygon from multiple polygons determined by the polygon determination module 235 based on the scores computed for the polygons by the scoring module 240. The polygon selection module 245 may make the selection by comparing the scores. For example, the polygon selection module 245 may compare the scores computed for the polygons and select the polygon associated with the highest score. In various embodiments, the polygon selection module 245 also may select a polygon based on one or more additional values computed by the scoring module 240. In such embodiments, the polygon selection module 245 may perform a filtering process, in which one or more polygons are filtered out based on the additional value(s) and a polygon from a remaining set of candidate polygons is then selected. The polygon selection module 245 may perform the filtering process by comparing each of these additional values computed for a polygon to a threshold value and filtering out the polygon if the additional value is less than the threshold value. For example, the polygon selection module 245 may filter out polygons associated with n-Sigma values that are less than a first threshold value, polygons associated with KL Divergence values that are less than a second threshold value, and/or polygons associated with ratios to a top score that are less than a third threshold value. In this example, the polygon selection module 245 may then select a polygon from the remaining candidate polygons based on the score for each candidate polygon (e.g., by comparing the scores for the remaining candidate polygons and selecting the polygon associated with the highest score).

In various embodiments, the polygon selection module 245 may not select a single polygon from the polygons determined by the polygon determination module 235. In such embodiments, the polygon selection module 245 may not select any polygons (e.g., if all the polygons are filtered out in the filtering process). Alternatively, in some embodiments, the polygon selection module 245 may select multiple polygons. For example, after performing the filtering process, the polygon selection module 245 may select multiple polygons if the scores associated with multiple remaining candidate polygons are within a threshold of each other. The functionality of the polygon selection module 245 is further described below in conjunction with FIGS. 3, 5A, and 5B.

The location inferring module 250 infers (e.g., as shown in step 325 of FIG. 3) a geographic location for an entity as a polygon selected by the polygon selection module 245, in which the geographic granularity of the inferred geographic location is at the geographic granularity of the selected polygon. For example, suppose that the scoring module 240 has computed scores for various polygons based on interactions by users of the online system 140 with an entity, in which the users have a geographic location that is within the corresponding polygons, as described above. In this example, if the polygon selection module 245 selects a polygon that is defined at a geographic granularity corresponding to a city, in which the polygon includes a region on a geographic map corresponding to the city of San Francisco, the location inferring module 250 infers that the geographic location of the entity corresponds to the city of San Francisco.

As described above, in some embodiments, the polygon selection module 245 may not select a single polygon from the polygons determined by the polygon determination module 235. In such embodiments, the location inferring module 250 may infer that a geographic location for an entity is global. For example, if all the polygons are filtered out in the filtering process performed by the polygon selection module 245, such that the polygon selection module 245 does not select any polygons, the location inferring module 250 may infer that an entity has a global geographic location. Alternatively, in embodiments in which the polygon selection module 245 does not select a single polygon, the location inferring module 250 may infer multiple geographic locations for an entity. For example, suppose that after performing the filtering process, the polygon selection module 245 selects two polygons, in which the polygons are both defined at a geographic granularity corresponding to a state and include regions on a geographic map corresponding to the states of California and New York. In this example, the location inferring module 250 may infer that the geographic locations of the entity correspond to the states of California and New York. The functionality of the location inferring module 250 is further described below in conjunction with FIG. 3.

The content selection module 255 selects one or more content items for communication to a client device 110 to be presented to a viewing user of the online system 140. Content items eligible for presentation to the viewing user are retrieved from the content store 210 or from another source by the content selection module 255, which selects one or more of the content items for presentation to the viewing user. A content item eligible for presentation to the viewing user is a content item associated with at least a threshold number of targeting criteria satisfied by characteristics of the viewing user or is a content item that is not associated with targeting criteria. In various embodiments, the content selection module 255 includes content items eligible for presentation to the viewing user in one or more content selection processes, which identify a set of content items for presentation to the viewing user. For example, the content selection module 255 determines measures of relevance of various content items to the viewing user based on characteristics associated with the viewing user by the online system 140 and based on the viewing user's affinity for different content items. Based on the measures of relevance, the content selection module 255 selects content items for presentation to the viewing user. As an additional example, the content selection module 255 selects content items having the highest measures of relevance or having at least a threshold measure of relevance for presentation to the viewing user. Alternatively, the content selection module 255 ranks content items based on their associated measures of relevance and selects content items having the highest positions in the ranking or having at least a threshold position in the ranking for presentation to the viewing user.

Content items selected for presentation to a viewing user may be associated with bid amounts. The content selection module 255 may use the bid amounts associated with content items when selecting content for presentation to the viewing user. In various embodiments, the content selection module 255 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of a viewing user presented with the content from the content item interacting with the content. The content selection module 255 may rank content items based on their associated bid amounts and select content items having at least a threshold position in the ranking for presentation to a viewing user. In some embodiments, the content selection module 255 ranks both content items not associated with bid amounts and content items associated with bid amounts in a unified ranking based on bid amounts and measures of relevance associated with content items. Based on the unified ranking, the content selection module 255 selects content for presentation to the viewing user. Selecting content items through a unified ranking is further described in U.S. patent application Ser. No. 13/545,266, filed on Jul. 10, 2012, which is hereby incorporated by reference in its entirety.

For example, the content selection module 255 receives a request to present a feed of content to a viewing user of the online system 140. The feed may include one or more advertisements as well as other content items, such as stories describing actions associated with other online system users connected to the viewing user. The content selection module 255 accesses one or more of the user profile store 205, the content store 210, the action log 220, and the edge store 225 to retrieve information about the viewing user. For example, stories or other data associated with users connected to the viewing user are retrieved. The retrieved stories or other content items are analyzed by the content selection module 255 to identify candidate content that is likely to be relevant to the viewing user. For example, stories associated with users not connected to the viewing user or stories associated with users for which the viewing user has less than a threshold affinity are discarded as candidate content. Based on various criteria, the content selection module 255 selects one or more of the content items identified as candidate content for presentation to the viewing user. The selected content items may be included in a feed of content that is presented to the viewing user. For example, the feed of content includes at least a threshold number of content items describing actions associated with users connected to the viewing user via the online system 140.

In various embodiments, the online system 140 presents content to a viewing user through a newsfeed including a plurality of content items selected for presentation to the viewing user. One or more advertisements also may be included in the feed. The content selection module 255 may determine the order in which selected content items are presented via the feed. For example, the content selection module 255 orders advertisements or other content items in the feed based on likelihoods of the viewing user interacting with various content items. The functionality of the content selection module 255 is further described below in conjunction with FIG. 3.

The web server 260 links the online system 140 via the network 120 to the one or more client devices 110, as well as to the one or more third-party systems 130. The web server 260 serves web pages, as well as other content, such as JAVA®, FLASH®, XML and so forth. The web server 260 may receive and route messages between the online system 140 and the client device 110, for example, instant messages, queued messages (e.g., email), text messages, short message service (SMS) messages, or messages sent using any other suitable messaging technique. A user may send a request to the web server 260 to upload information (e.g., images or videos) that are stored in the content store 210. Additionally, the web server 260 may provide application programming interface (API) functionality to send data directly to native client device operating systems, such as IOS®, ANDROID™, WEBOS® or BlackberryOS.

Inferring a Geographic Location for an Entity at a Geographic Granularity Based on Geographic Locations of Users of an Online System Interacting with the Entity FIG. 3 is a flow chart of a method for inferring a geographic location for an entity at a geographic granularity based on geographic locations of users of an online system interacting with the entity. In other embodiments, the method may include different and/or additional steps than those shown in FIG. 3. Additionally, steps of the method may be performed in a different order than the order described in conjunction with FIG. 3.

The online system 140 receives 305 (e.g., using the action logger 215) information describing one or more interactions by each of a set of users of the online system 140 with an entity having a presence in the online system 140, in which the information includes a geographic location of each of the set of users. As described above, in some embodiments, the interaction(s) may be associated with an event associated with the entity, a domain associated with the entity, a physical location associated with the entity, an object maintained in the online system 140 associated with the entity (e.g., a page, a content item, a group, or an application), etc. Furthermore, as also described above, the interaction(s) by the set of users may be of various types (e.g., expressing a preference for a page associated with the entity, commenting on a content item posted by the entity, etc.). For example, the online system 140 receives 305 information indicating that a user of the online system 140 checked in to a physical location associated with an entity having a presence in the online system 140, in which the information includes a current geographic location of a client device 110 associated with the user. In some embodiments, the geographic location of each of the set of users may be stored in a corresponding user profile of the user (e.g., in the user profile store 205). In the above example, information received 305 at the online system 140 may include a geographic location of a workplace of the user, a geographic location of a hometown of the user, etc., which may be stored in a user profile of the user.

Figure 4:
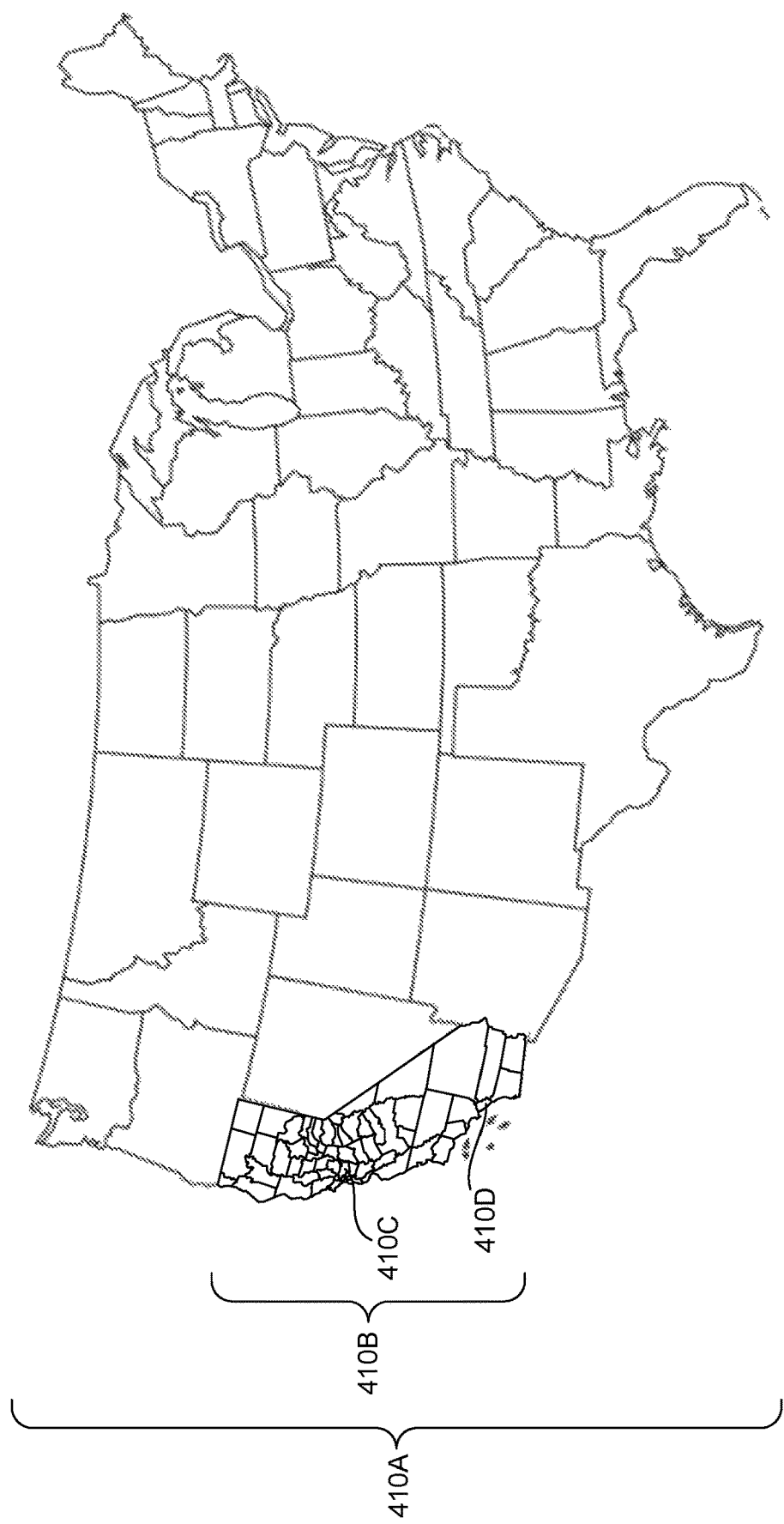
FIG. 4 is an example of multiple polygons defined at different geographic granularities, in which each polygon includes a region on a geographic map, in accordance with an embodiment.

The online system 140 then determines 310 (e.g., using the polygon determination module 235) multiple polygons that each includes a region on a geographic map (e.g., stored in the map store 230), in which the polygons are defined at different geographic granularities. As described above, geographic granularities may include a campus, a park, a neighborhood, a village, a town, a borough, a city, a zip code, a county, a forest, a desert, a region, a state, an island, a country, a continent, etc. For example, as shown in the example of FIG. 4, if a geographic map corresponds to a map of the contiguous United States, the online system 140 may determine 310 a first polygon that includes a region 410A corresponding to the 48 contiguous states and the District of Columbia. In this example, the online system 140 also may determine 310 a second polygon that includes a region 410B corresponding to the state of California. Continuing with this example, the online system 140 also may determine (in step 310) additional polygons that include regions within the state of California, such as a third polygon that includes a region 410C corresponding to Contra Costa County and a fourth polygon that includes a region 410D corresponding to Orange County. Although not illustrated in FIG. 4, the online system 140 also may determine (in step 310) additional polygons defined at other geographic granularities (e.g., cities, zip codes, etc.).

Referring back to FIG. 3, the online system 140 computes 315 (e.g., using the scoring module 240) a score for each polygon. The online system 140 computes 315 the score for a polygon based at least in part on a number of users of the online system 140 who have interacted with the entity, in which the users have a geographic location that is within the polygon, as well as a total number of users of the online system 140 who have a geographic location that is within the polygon. FIG. 5A illustrates a table of values that may be used to infer a geographic location for an entity, in which each row of values corresponds to a polygon. In the example of FIG. 5A, for a polygon that includes a region named 505 San Francisco, in which the polygon is defined at the geographic granularity 510 of a county, suppose that the number of online system users who have interacted with an entity 515 having a presence in the online system 140 and who have a current geographic location that is within the polygon is 24,131 and that the total number of online system users 520 who have a current geographic location that is within the polygon is 96,116. In this example, the online system 140 may compute 315 the score 525A for the polygon to be a ratio of the first number of users to the second number of users (i.e., 24,131/96,116 or 0.25106122). In this example, the online system 140 may compute 315 the score for each additional polygon (i.e., polygons including regions corresponding to the city of San Francisco, the state of California, the county of Alameda, etc.) in a similar manner.

In some embodiments, the online system 140 also may compute 315 the score for a polygon based on one or more weights associated with users who interacted with the entity, in which the users have a geographic location that is within the polygon. In various embodiments, the weights may be associated with each user based on a type of interaction with the entity by the user. As described above, types of interactions with the entity by users of the online system 140 may include sending a message to the entity, joining a group associated with the entity, attending an event associated with the entity, etc. For example, the online system 140 may associate a weight with each user who interacted with the entity based on a type of interaction with the entity, such that a user who installed an application associated with the entity is associated with a first weight and a user who clicked on a content item posted by the entity is associated with a second weight. In this example, to compute 315 a score for a polygon, the online system 140 may compute a product of the first weight and a number of users who installed the application and who have a geographic location within the polygon, as well as a product of the second weight and a number of users who clicked on the content item and who have a geographic location within the polygon. Continuing with this example, the online system 140 may compute 315 the score for the polygon as a ratio of the sum of the products to a total number of users of the online system 140 who have a geographic location that is within the polygon. In various embodiments, the weights may be based on an amount of time that has elapsed since each user interacted with the entity. In the above example, the weight associated with each user alternatively may be inversely proportional to an amount of time that has elapsed since the user interacted with the entity.

In some embodiments, the online system 140 also may compute 315 the score for a polygon based on one or more values computed by the online system 140. As described above, in various embodiments, the online system 140 may compute a measure of commonality for each polygon that describes a percentage of interactions with the entity by users of the online system 140 having a geographic location that is within the polygon. As also described above, in some embodiments, the online system 140 also may compute a measure of over-performance for each polygon that describes a number of interactions with the entity by users of the online system 140 having a geographic location that is within the polygon that exceeds the number of interactions with the entity expected for users of the online system 140, given the population of the polygon. In embodiments in which the online system 140 computes a value that indicates a measure of commonality and/or a value that indicates a measure of over-performance for a polygon, the online system 140 may compute 315 a score for the polygon based at least in part on one or more of these values. FIG. 5B illustrates an additional table of values that may be used to infer a geographic location for an entity, in which each row of values corresponds to a polygon. As shown in the example of FIG. 5B, once the online system 140 has computed a measure of commonality 530 and a measure of over-performance 535 for each polygon, the online system 140 may compute 315 a score 525B for each polygon to be a product of the measure of commonality 530 and the measure of over-performance 535 for the polygon.

In various embodiments, in addition to computing 315 a score for each polygon, the online system 140 also may compute one or more additional values that may be used by the online system 140 to select 320 a polygon, as further described below. In some embodiments, the online system 140 may compute a ratio of a score to a top score computed 315 by the online system 140. In such embodiments, if a score computed 315 for a polygon is the highest score computed 315 for all polygons determined 310 by the online system 140, the ratio of the score to the top score is one. Furthermore, in such embodiments, if the score computed 315 for a polygon is not the highest score computed 315 for all polygons determined 310 by the online system 140, the ratio of the score to the top score is less than one. FIG. 5B illustrates examples of ratios 540 of the scores 525B computed 315 for each polygon to the highest score computed 315 for all of the polygons, in which the ratio 540 for the polygons that include the regions corresponding to the county and city of San Francisco is equal to one and the ratio 540 for all of the remaining polygons is less than one. Although not illustrated in FIG. 5B, in various embodiments, the online system 140 also may compute values for each polygon corresponding to statistical measures that indicate whether the number of users who have a geographic location that is within the polygon and who interacted with an entity having a presence in the online system 140 is statistically significant (e.g., an n-Sigma, a Kullback-Leibler (KL) Divergence, etc.).

Referring once more to FIG. 3, the online system 140 then selects 320 (e.g., using the polygon selection module 245) a polygon based on the scores. The online system 140 may make the selection by comparing the scores. For example, the online system 140 may compare the scores computed 315 for the polygons and select 320 the polygon associated with the highest score. In various embodiments, the online system 140 also may select 320 the polygon based on one or more additional values computed by the online system 140. In such embodiments, the online system 140 may perform a filtering process, in which one or more polygons are filtered out based on the additional value(s) and a polygon from a remaining set of candidate polygons is then selected 320. The online system 140 may perform the filtering process by comparing each of these additional values computed for a polygon to a threshold value and filtering out the polygon if the additional value is less than the threshold value. In various embodiments, the online system 140 may not select 320 a single polygon from the polygons. For example, the online system 140 may not select 320 any polygons (e.g., if all the polygons are filtered out in the filtering process) or the online system 140 may select 320 multiple polygons (e.g., if after performing the filtering process, the scores associated with multiple remaining candidate polygons are within a threshold of each other).

The online system 140 infers 325 (e.g., using the location inferring module 250) a geographic location for the entity as the selected polygon, in which the geographic granularity of the inferred geographic location is at the geographic granularity of the selected polygon. For example, if the online system 140 selects 320 a polygon that is defined at a geographic granularity corresponding to a city, in which the polygon includes a region on a geographic map corresponding to the city of San Francisco, the online system 140 infers 325 that the geographic location of the entity corresponds to the city of San Francisco. As described above, in some embodiments, the online system 140 may not select 320 a single polygon. In such embodiments, the online system 140 may infer 325 that a geographic location for the entity is global. For example, if all the polygons are filtered out in the filtering process performed by the online system 140, such that the online system 140 does not select 320 any polygons, the online system 140 may infer 325 that the entity has a global geographic location. Alternatively, in embodiments in which the online system 140 does not select 320 a single polygon, the online system 140 may infer 325 multiple geographic locations for the entity. For example, suppose that after performing the filtering process, the online system 140 selects 320 two polygons, in which the first polygon is defined at a geographic granularity corresponding to a state and includes a region on a geographic map corresponding to the state of California and the second polygon is defined at a geographic granularity corresponding to a city and includes a region on a map corresponding to the city of Chicago. In this example, the online system 140 may infer 325 that the geographic locations of the entity correspond to the state of California and the city of Chicago.

Once the online system 140 has inferred 325 the geographic location for the entity, the online system 140 may then send 330 content posted by the entity to one or more viewing users of the online system 140, in which the viewing users are determined based on a geographic location of each user that is within the selected polygon (i.e., within the inferred geographic location). For example, the online system 140 may direct content posted by the entity to viewing users who have a geographic location that is within the inferred geographic location of the entity. In some embodiments, if the geographic location of a viewing user is within the inferred geographic location for the entity, the online system 140 may send 330 the content posted by the entity for presentation to the viewing user if the content is selected for presentation to the viewing user (e.g., by the content selection module 255).

To send 330 content posted by the entity to one or more viewing users of the online system 140, the online system 140 may first identify an opportunity to send 330 content posted by the entity for display to the viewing user(s) (e.g., upon receiving a request from each viewing user to access a feed of local news items). The online system 140 may then determine a geographic location of each viewing user (e.g., based on information stored in a user profile of the viewing user describing a geographic location of the viewing user or based on information describing a geographic location of a client device 110 associated with the viewing user). The online system 140 may then send 330 content posted by the entity for presentation to a viewing user if the geographic location of the viewing user is within the inferred geographic location for the entity. For example, if the geographic location for a viewing user corresponds to the city of Oakland and the inferred geographic location of the entity corresponds to the city of Oakland or a geographic location that encompasses the city of Oakland (e.g., Alameda County, the state of California, the United States, etc.), the online system 140 may send 330 content posted by the entity for presentation to the viewing user. As an additional example, if the geographic location for a viewing user corresponds to a zip code within the city of Oakland and the inferred geographic location of the entity corresponds to a different zip code within the city of Oakland, the online system 140 may not send 330 the content posted by the entity for presentation to the viewing user.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving information describing one or more interactions by each of a set of users of an online system with an entity having a presence in the online system, the information including a geographic location of each of the set of users stored in a corresponding user profile;
determining a plurality of polygons each comprising a region on a geographic map, each of the plurality of polygons defined at one of a plurality of different geographic granularities including at least a first geographic granularity and a second geographic granularity, where a polygon defined at the first geographic granularity contains two or more polygons defined at the second geographic granularity;
for each of the plurality of polygons, computing a score based at least in part on a number of the set of users that have interacted with the entity having a geographic location that is within the polygon and a total number of users of the online system having a geographic location that is within the polygon;
selecting a polygon from the plurality of polygons based at least in part on the scores; and
inferring a geographic location for the entity as the selected polygon at the geographic granularity of the selected polygon.

2. The method of claim 1, wherein the plurality of different geographic granularities is selected from the group consisting of: a neighborhood, a zip code, a city, a county, a state, a country, and any combination thereof.

3. The method of claim 1, wherein the geographic location of each of the set of users stored in the corresponding user profile is based at least in part on one or more selected from the group consisting of: a home associated with a user, a business associated with a user, and any combination thereof.

4. The method of claim 1, wherein the one or more interactions by each of the set of users of the online system with the entity are associated with one or more of: a page, a content item, a group, an application, an event, a domain, and a physical location.

5. The method of claim 4, wherein the one or more interactions by each of the set of users of the online system with the entity are selected from the group consisting of: sending a message to the entity, expressing a preference for the page, accessing the page, accessing the content item, expressing a preference for the content item, commenting on the content item, sharing the content item, joining the group, installing the application, attending the event, clicking on a URL associated with the domain, checking-in to the physical location, and any combination thereof.

6. The method of claim 1, wherein computing the score for each of the plurality of polygons is further based at least in part on a weight associated with each user included among the number of the set of users that have interacted with the entity having the geographic location that is within the polygon.

7. The method of claim 6, wherein the weight is inversely proportional to an amount of time that has elapsed since an interaction with the entity by each user included among the number of the set of users that have interacted with the entity having the geographic location that is within the polygon.

8. The method of claim 6, wherein the weight is based at least in part on a type of interaction with the entity by each user included among the number of the set of users that have interacted with the entity having the geographic location that is within the polygon.

9. The method of claim 1, further comprising:
sending content posted by the entity to a plurality of viewing users of the online system, the plurality of users determined based at least in part on a geographic location of each of the plurality of users that is within the selected polygon.

10. The method of claim 1, wherein the score computed for each of the plurality of polygons corresponds to a ratio of the number of the set of users that have interacted with the entity having a geographic location that is within the polygon to a total number of users of the online system having a geographic location that is within the polygon.

11. A computer program product comprising a non-transitory computer readable storage medium having instructions encoded thereon that, when executed by a processor, cause the processor to:
receive information describing one or more interactions by each of a set of users of an online system with an entity having a presence in the online system, the information including a geographic location of each of the set of users stored in a corresponding user profile;
determine a plurality of polygons each comprising a region on a geographic map, each of the plurality of polygons defined at one of a plurality of different geographic granularities including at least a first geographic granularity and a second geographic granularity, where a polygon defined at the first geographic granularity contains two or more polygons defined at the second geographic granularity;
for each of the plurality of polygons, compute a score based at least in part on a number of the set of users that have interacted with the entity having a geographic location that is within the polygon and a total number of users of the online system having a geographic location that is within the polygon;
select a polygon from the plurality of polygons based at least in part on the scores; and
infer a geographic location for the entity as the selected polygon at the geographic granularity of the selected polygon.

12. The computer program product of claim 11, wherein the plurality of different geographic granularities is selected from the group consisting of: a neighborhood, a zip code, a city, a county, a state, a country, and any combination thereof.

13. The computer program product of claim 11, wherein the geographic location of each of the set of users stored in the corresponding user profile is based at least in part on one or more selected from the group consisting of: a home associated with a user, a business associated with a user, and any combination thereof.

14. The computer program product of claim 11, wherein the one or more interactions by each of the set of users of the online system with the entity are associated with one or more of: a page, a content item, a group, an application, an event, a domain, and a physical location.

15. The computer program product of claim 14, wherein the one or more interactions by each of the set of users of the online system with the entity are selected from the group consisting of: sending a message to the entity, expressing a preference for the page, accessing the page, accessing the content item, expressing a preference for the content item, commenting on the content item, sharing the content item, joining the group, installing the application, attending the event, clicking on a URL associated with the domain, checking-in to the physical location, and any combination thereof.

16. The computer program product of claim 11, wherein compute the score for each of the plurality of polygons is further based at least in part on a weight associated with each user included among the number of the set of users that have interacted with the entity having the geographic location that is within the polygon.

17. The computer program product of claim 16, wherein the weight is inversely proportional to an amount of time that has elapsed since an interaction with the entity by each user included among the number of the set of users that have interacted with the entity having the geographic location that is within the polygon.

18. The computer program product of claim 16, wherein the weight is based at least in part on a type of interaction with the entity by each user included among the number of the set of users that have interacted with the entity having the geographic location that is within the polygon.

19. The computer program product of claim 11, wherein the computer-readable storage medium further has instructions encoded thereon that, when executed by the processor, cause the processor to:
send content posted by the entity to a plurality of viewing users of the online system, the plurality of users determined based at least in part on a geographic location of each of the plurality of users that is within the selected polygon.

20. The computer program product of claim 11, wherein the score computed for each of the plurality of polygons corresponds to a ratio of the number of the set of users that have interacted with the entity having a geographic location that is within the polygon to a total number of users of the online system having a geographic location that is within the polygon.

* * * * *